US008107440B2

(12) United States Patent
Nádas et al.

(10) Patent No.: US 8,107,440 B2
(45) Date of Patent: Jan. 31, 2012

(54) TRANSPORT NETWORK CONGESTION CONTROL FOR ENHANCED UPLINK COMMUNICATIONS

(75) Inventors: Szilveszter Nádas, Budapest (HU); Sándor Rácz, Cegléd (HU); Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 166 days.

(21) Appl. No.: 12/546,392

(22) Filed: Aug. 24, 2009

(65) Prior Publication Data
US 2011/0044168 A1    Feb. 24, 2011

(51) Int. Cl.
G01R 31/08    (2006.01)
H04W 4/00    (2009.01)
H04W 36/00    (2009.01)
(52) U.S. Cl. ............... 370/332; 455/442; 370/229
(58) Field of Classification Search ............ 370/242, 370/248, 251, 318, 329, 331, 332, 333, 341, 370/342, 344, 216, 217, 218, 229, 238, 395.2, 370/395.4, 235, 328, 237; 455/450, 442, 455/436, 452.2, 13.4, 524, 525, 67.11, 515, 455/134, 135, 115.1, 115.2, 445, 446, 443
See application file for complete search history.

(56) References Cited

U.S. PATENT DOCUMENTS

| 7,286,801 | B2 * | 10/2007 | Amerga et al. | 455/67.11 |
| 2009/0201856 | A1 * | 8/2009 | Hayashi et al. | 370/328 |
| 2009/0225656 | A1 * | 9/2009 | Takagi et al. | 370/235 |
| 2010/0062777 | A1 * | 3/2010 | Nadas et al. | 455/445 |
| 2010/0203893 | A1 * | 8/2010 | Lundh et al. | 455/445 |
| 2010/0220594 | A1 * | 9/2010 | Racz et al. | 370/235 |

FOREIGN PATENT DOCUMENTS

| EP | 1816879 A1 | 8/2007 |
| EP | 1901483 A1 | 3/2008 |
| WO | WO 2007/069948 A1 | 6/2007 |
| WO | WO 2008/066427 | 6/2008 |
| WO | WO 2008/066430 | 6/2008 |
| WO | WO 2009/058084 | 5/2009 |

OTHER PUBLICATIONS

3GPP TS 25.427 v6.6.0 (Mar. 2006), pp. 1-41.
Nádas et al., HSUPA Transport Network Congestion Control, IEEE, Nov. 4, 2008, pp. 1-6.
Notification of Transmittal of the International Search Report and the Written Opinion of the International Searching Authority mailed Oct. 28, 2010 in corresponding Application No. PCT/SE2010/050879.
"E-DCH TNL Congestion Control with Soft Handover", 3GPP Draft; R3-060266, TSG-RAN Working Group 3 Meeting #151, Denver, USA, Feb. 13-17, 2006.

* cited by examiner

Primary Examiner — Hanh Nguyen
(74) Attorney, Agent, or Firm — Nixon & Vanderhye P.C.

(57) ABSTRACT

For a mobile radio connection having at least two uplink flows, a determination is made whether one of the uplink flows from a non-serving cell has a better radio link quality than another of the uplink flows from a serving cell. A congestion condition in the radio access transport network is monitored for those uplink flows. If congestion in the radio access transport network for the non-serving cell uplink flow is detected when that uplink flow is associated with the better radio link quality, then a message is generated for transmission to the mobile radio terminal to reduce a rate at which the mobile radio terminal transmits data for the connection to the radio access transport network rather than the non-serving cell discarding uplink data packets.

17 Claims, 8 Drawing Sheets

TRANSPORT NETWORK CONGESTION CONTROL FOR ENHANCED UPLINK COMMUNICATIONS

TECHNICAL FIELD

The technical field relates to radio telecommunications, and particularly, to enhanced uplink packet flow control.

BACKGROUND

A mobile radio communication system, such as a UMTS (Universal Mobile Telecommunication System) type system, includes a mobile radio communication network communicating with mobile terminals or UEs (User Equipments) and with external networks. Traditionally, communications are facilitated using one or more radio base stations that provide radio coverage for one or more cell areas. Recent deployment of High Speed Downlink Packet Access (HSDPA) in operational 3G networks increases the downlink system capacity providing improved end-user experience by higher download speed and reduced round trip times. Enhanced Dedicated Channel (E-DCH) provides improved uplink performance in 3GPP Releases 6 and 7. New Medium Access Control layers (MAC-e/es) were introduced to support High Speed Uplink Packet Access (HSUPA) features like fast Hybrid Automatic Repeat Request (HARQ) with soft combining, reduced TTI length, and fast scheduling.

In spite of the fact that similar features have been introduced for HSDPA and HSUPA, there are several differences. In HSDPA, the High Speed Downlink Shared Channel (HS-DSCH) is shared in time domain among all users, but for HSUPA, the E-DCH is dedicated to a user. For HSDPA, the transmission power is kept more or less fixed and rate adaptation is used. However, this is not possible for HSUPA since the uplink is non-orthogonal, and therefore, fast power control is needed for fast link adaption. Soft handover is not supported by HSDPA, while for HSUPA soft handover is used to decrease the interference from neighboring cells and to have macro diversity gain.

The transport network links between base stations and radio network controller (Iub interface) and between radio network controllers (Iur interface) can be a bottleneck in the radio access network for HSUPA because the increased air interface (Uu) capacity does not always come with similarly increased transport network capacity. The cost of transport network links is high and may not decrease significantly. Given that congestion over a transport link cannot be solved by Transmission Control Protocol (TCP) efficiently because of lower layer retransmissions, HSUPA flow control can be used. The goal of Enhanced Uplink flow control is to avoid congestion on the Iub interface between the RNC and Node-B, i.e., to avoid congestion in the transport network (TN). For this purpose, a new control frame and a new Information Element for the E-DCH Iub/Iur data frame are introduced in 3GPP TS 25.427 V6.6.0 (2006-03), "UTRAN Iub/Iur interface user plane protocol for DCH data streams." The new control frame is a Transport network layer (TNL) Congestion Indication (TCI) control frame (CF) and the new information element is the TCI. Based on the received E-DCH data frame sequence, the RNC can detect TNL congestion and indicate different types of congestions to the Node-B using the TCI CF. Based on the received TCI, the Node-B takes action to resolve congestion.

In the uplink, the user equipment terminal (UE) can be connected to more than one cell in soft handover (SHO). One of the SHO cells is the serving cell, and the remaining SHO cells are non-serving cells. Ideally, the radio links with the serving cell have the best radio quality, and the radio link with each non-serving cell also has acceptable radio quality. Serving cell selection is based on the radio link quality in the downlink direction from radio network to UE. But in real world systems, the non-serving cell may have better radio link quality than the serving cell in the uplink direction from the UE to the radio network. Unfortunately, typical EUL flow control assumes that the serving cell is the best cell for both downlink and uplink radio communications with the UE. (For purposes of this application, the term "flow" is used and is associated with a physical layer communications link that carries packets between the RNC and the UE.) Fairness among the flows is guaranteed only when this best cell assumption is correct. Under this assumption and in a congestion condition in the transport network, typical EUL flow control has the non-serving cell drop or discard packets received from the UE to reduce the congestion. This is not a problem as long as the serving cell really is the best cell in the uplink direction because those same packets are usually properly received in the serving cell anyway, so the redundancy normally provided in the non-serving cell is not needed.

But a problem with this typical approach occurs when the non-serving cell becomes the best cell at least in the uplink direction but still remains the non-serving cell, e.g., because the current serving cell still remains the best cell in the downlink. If the transport network experiences congestion for the UE flow, e.g., because the available uplink radio bandwidth for the flow is larger than the available uplink bandwidth for the flow in the transport network), then flow control continues to reduce congestion in the transport network by dropping packets at the non-serving cell even though it is the best cell currently for the uplink communication from the UE.

Consider the following example situation. Assume a good radio quality that allows the UE to transmit data over the radio interface up to, e.g., 1 Mbps, but the available transport network bandwidth for this flow is, e.g., 500 kbps. In this example, the system is transport network limited because 1 Mbps>500 kbps. The EUL flow control then avoids transport network congestion non-serving cells by dropping packets. In this example, if the data arrives from UE to a Node-B with 1 Mbps, the EUL flow control drops at least half of the packets to avoid transport network congestion when the available transport network bandwidth is only 500 kbps.

This packet dropping flow control is not appropriate when the non-serving cell uplink flow might have better quality then that for a flow to the serving cell. The result in this packet dropping situation at the non-serving cell is the need for increased RLC retransmissions for the dropped packets, which ultimately results in poor end-user quality of service and unfair end-use of resources.

SUMMARY

A method and apparatus are provided for controlling congestion in a radio access transport network that includes a radio network controller coupled to multiple base stations with each base station supporting one or more cells. Mobile radio terminals communicate with the radio access transport network over an air interface. A connection is established between a mobile radio terminal with at least two cells associated with the radio access transport network being used to support uplink radio communication from the mobile radio terminal, one of the cells corresponding to a serving cell for the uplink radio communication and another of the cells being a non-serving cell for the uplink radio communication. The radio access transport network supports soft handover in the uplink, and the first and second uplink flows are part of soft handover of the connection in the uplink. The serving cell typically provides better downlink radio signal quality for the connection than the non-serving cell and the non-serving cell provides better uplink radio signal quality for the connection than the serving cell.

A determination is made whether the second radio uplink flow is associated with a better radio link quality than radio link quality associated with the first radio uplink flow. Congestion in the radio access transport network is monitored for a first radio uplink flow associated with the connection and supported by the serving cell and for a second radio uplink flow associated with the connection and supported by the non-serving cell. If a congestion condition in the radio access transport network for the second radio uplink flow is detected when the second radio uplink flow is associated with a better radio link quality than radio link quality associated with the first radio uplink flow, then a message is generated for transmission to the mobile radio terminal to reduce a rate at which the mobile radio terminal transmits data for the connection to the radio access transport network rather than the non-serving cell discarding uplink data packets received from the mobile terminal.

In one example embodiment, in response to the detected uplink congestion condition in the radio access transport network for the second uplink flow, the message is sent to the mobile radio terminal via the serving cell to reduce a rate at which the mobile radio terminal transmits data for the connection to the radio access transport network.

The better radio link quality may, for example, be determined based on a data rate associated with the first uplink flow and a data rate associated with the second uplink flow such that the uplink flow with the higher data rate has the better flow quality.

In one example implementation, the message to the mobile radio terminal to reduce a rate at which the mobile radio terminal transmits data for the connection may be a lower absolute grant message, the radio access transport network supports enhanced uplink transmission, the congestion control message is a transport network congestion indicator, and in response to the detected uplink congestion condition in the radio access transport network for the second uplink flow, the transport network congestion indicator is sent to the serving cell for transmission to the mobile radio terminal.

If the first uplink flow is determined to be associated with a better radio link quality than the second uplink flow and a congestion condition in the radio access transport network for the second uplink flow is detected, then the base station associated with the non-serving cell discards a fraction of second uplink flow data packets from the mobile radio terminal in order to reduce the detected congestion for the second uplink flow.

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes and functions described may be substantially represented in a computer-readable medium and can be executed by a computer or processor.

The functions of the various elements including control-related functional blocks may be provided through the use of electronic circuitry such as dedicated hardware as well as computer hardware capable of executing software. When provided by a computer processor, the functions may be provided by a single dedicated processor, by a single shared processor, or by a plurality of individual processors, some of which may be shared or distributed. Moreover, a processor or controller may include, without limitation, digital signal processor (DSP) hardware, ASIC hardware, read only memory (ROM), random access memory (RAM), and/or other storage media.

Figure 1:
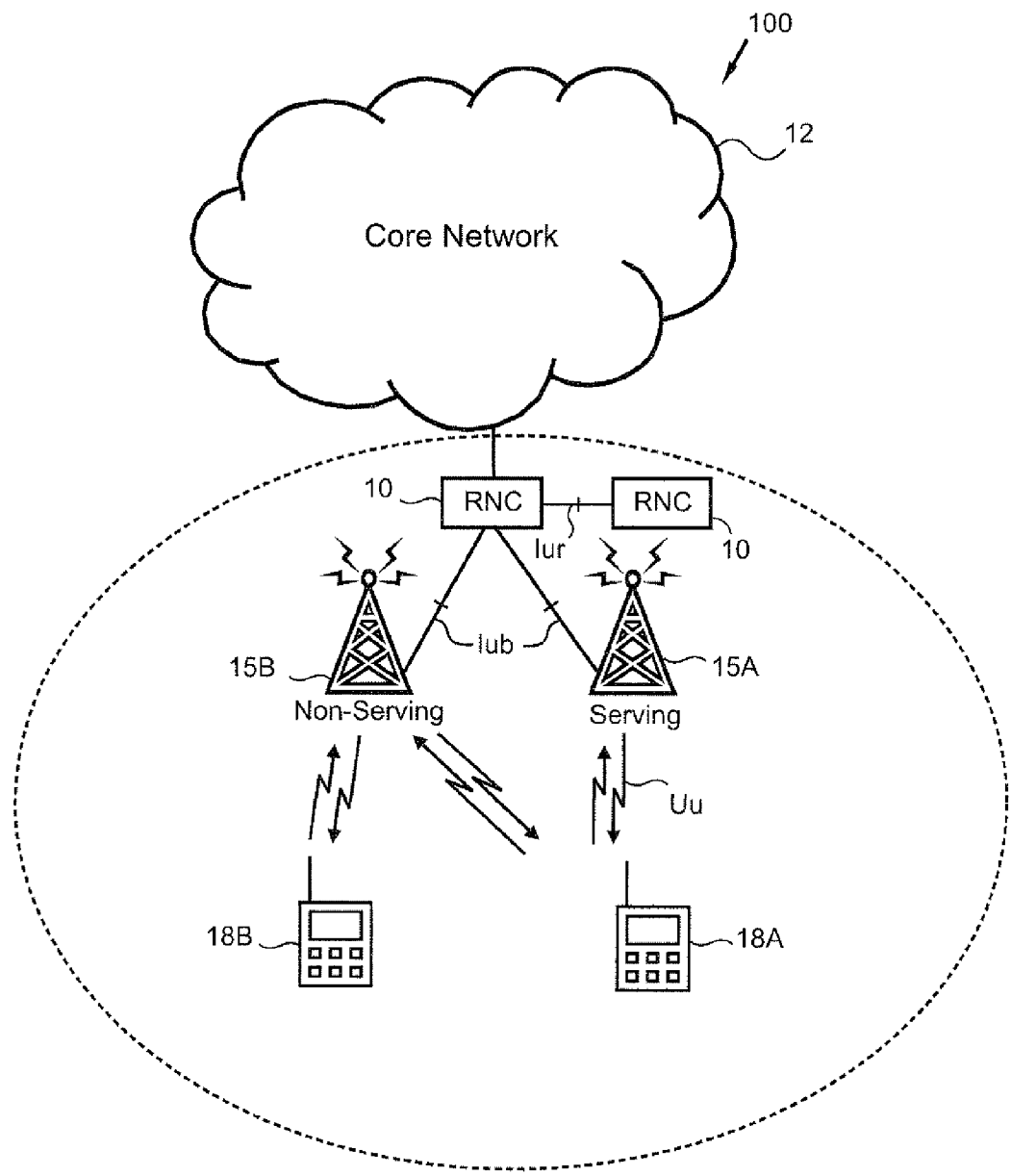
FIG. 1 is a schematic block diagram illustrating a wireless communication system.

FIG. 1 depicts a non-limiting, example communication system 100 comprising a Radio Access Network (RAN) shown as a dashed ellipse, such as the UMTS Terrestrial Radio Access Network (UTRAN) architecture, comprising two Radio Base Station (RBS) 15A and 15B connected to one or more Radio Network Controllers (RNCs) 10. The radio access network is connected to a Core Network 12. The radio access network and the core network provide communication and control for a plurality of user equipments (UE) 18 that each uses downlink (DL) channels and uplink (UL) channels. Each base station 20 coordinates radio communications in one or more cells. The radio base stations may be for example an access point, a Node B, an evolved Node B (eNodeB) and/or a base transceiver station, Access Point Base Station, base station router, etc. depending on the radio access technology and terminology used. A cell covers a geographical area and is identified by a unique identity broadcast in the cell by its base station. There may be more than one cell covering the same geographical area, and in this case, two of the base station cells may be co-sited. Each Radio Network Controller (RNC) 10 controls radio resources and radio connectivity within a set of cells.

A UE or mobile radio terminal connection logically represents the communication between a UE and one cell in the radio access network, and a radio link provides the actual physical radio connection between the UE and a base station associated with the cell. All cells with a radio link to/from a UE belong to the active set of that UE. An active set of base stations corresponds to the set of base stations that have a cell with a radio link with the UE. The user equipment 18 may be represented e.g. by a mobile station, a wireless communication terminal, a mobile cellular telephone, a Personal Communications Systems terminal, a Personal Digital Assistant (PDA), a laptop, a computer, or any other kind of device capable of radio communications.

On the downlink channel, one or more radio base stations transmit to a UE 18 at respective power level. On the uplink channel, the user equipments 18A and 18B transmit data to one or more radio base stations 15 at respective power level. In this example, base station 15A is the serving base station because it enjoys the best downlink radio link quality to the UE 18A.

FIG. 1 shows interfaces connecting the different nodes in the UTRAN. The Iur interface is defined for communications between RNCs 10. The Iub interface is defined for communications between the RNC 10 and its base stations 15A and 15B. User data is transported on transport bearers over these interfaces. Depending on the transport network used, these transport bearers may be mapped to AAL2 connections (in case of an ATM-based transport network) or UDP connections (in case of an IP-based transport network). Control messages are transported using the same bearers as data over Iub. Furthermore, radio bearers for signaling and data respectively are established between the serving RNC and the UE. These signaling radio bearers carry radio resource control (RRC) messages between a serving RNC and the UE and are sent via all cells in the UE's active set For illustration purposes only, the communication system 100 is described below as a HSDPA/HSUPA communication system. But the technology in this application may be used in other packet based communications systems such as E-UTRAN, LTE, Code division multiple access (CDMA), Wideband Code Division Multiple Access (WCDMA), CDMA 2000, High Speed Uplink Packet Data Access (HSUPA), High Data Rate (HDR), TD-SCDMA, WiMax, etc.

Figure 2:
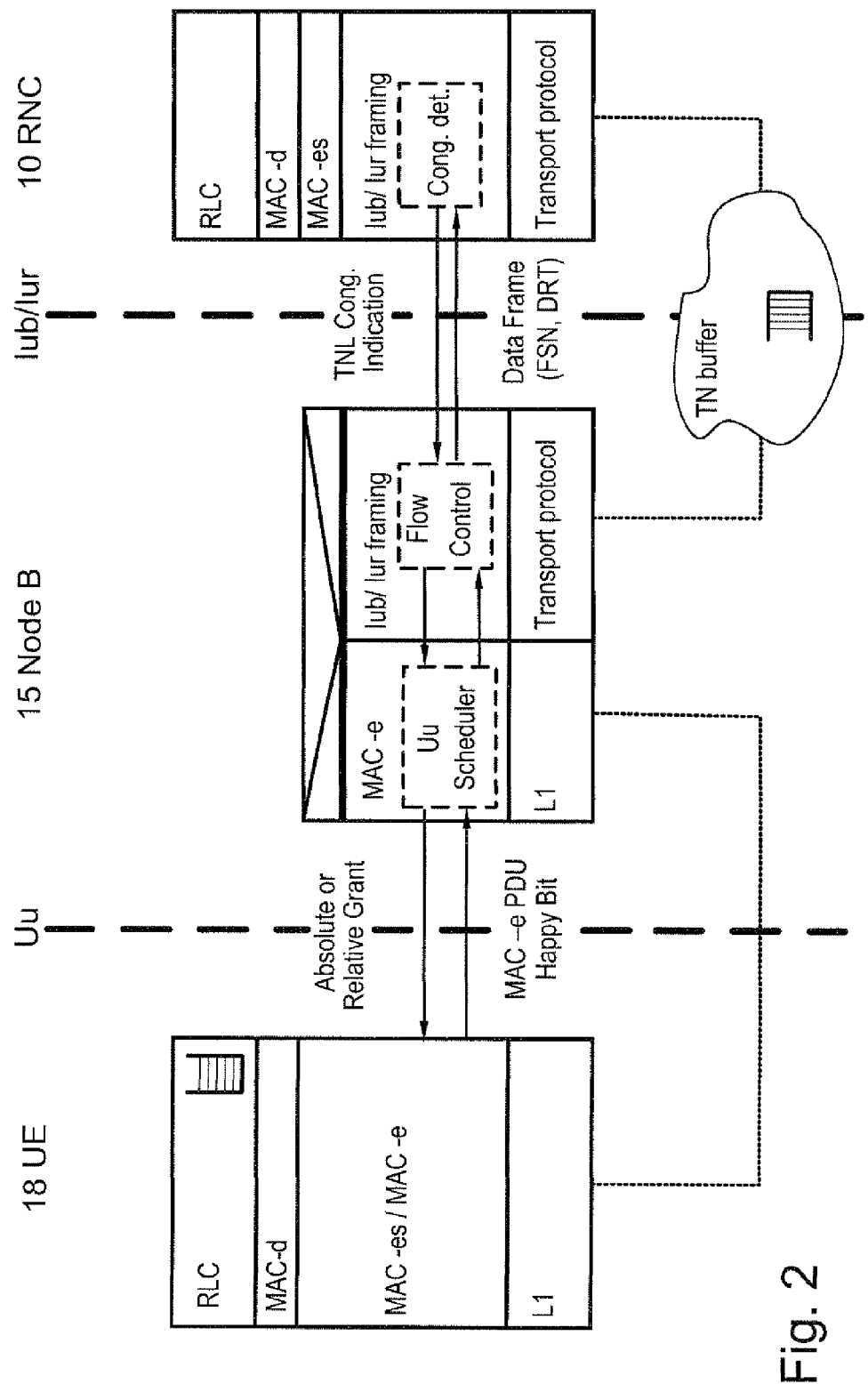
FIG. 2 is a block diagram illustrating a non-limiting example of a HSDPA flow control architecture and protocol stack.

Nodes and protocol layers that may be involved in the HSUPA and EUL flow control (FC) are depicted in FIG. 2. FIG. 2 also shows the location of the FC related functionalities. The task of the flow control in the Node B is to regulate the transfer of MAC-es Protocol Data Units (PDUs) on the Iub/Iur Transport Network (TN) towards the serving RNC (SRNC) for that flow. In this example, a flow corresponds to this MAC-es PDU stream. Several of these flows may share the same air interface or be impacted by the same transport network (TN) congestion bottleneck. Typically, flow control is needed only when the TN limits performance.

When HSUPA is carrying moderate-speed Quality of Service (QoS) sensitive traffic, the QoS can be guaranteed by TN bandwidth reservation using TN admission control and flow control need not be used. For best-effort traffic, TN bandwidth reservation is not efficient and flow control is preferably used.

As described above, User Equipment (UE) can be in Soft Handover (SHO) in the uplink, which means that its transmission is received by more than one cell. One of these cells, usually the one with the best quality downlink radio connection, is called the "serving cell" and the rest are called "non-serving cells." When a UE is in SHO, it has as many flows over the transport network (TN) as the number of Node Bs involved in the SHO.

The transport network provides transmission between the Node B and SRNC. ATM/AAL2 (ATM Adaptation Layer 2) and UDP/IP (User Datagram Protocol/Internet Protocol) are example transport protocols. A bottleneck in the transport network may occur at a point of aggregation and also in the nodes themselves on interface cards. The transport network may support Transport Network Layer (TNL) QoS differentiation, which allows for different controlled flows to have different service over the transport network based on, e.g., subscription or service. Different flows of the same Node B may experience a bottleneck at different parts of the network, not only due to different TNL QoS levels, but also due to some flows being transmitted over the Iur interface or over parallel Iub links. Additionally, flows must be able to efficiently use the changing transport network capacity remaining from high priority flows to ensure efficient utilization of the transport network. The flow control must be capable of regulating the flows in this changing environment and must maintain high end-user throughput and fairness while maintaining low end-to-end delay for delay sensitive applications, e.g., gaming over best effort HSUPA.

The HSUPA air interface scheduler (the Uu scheduler in FIG. 2) sends scheduling grants to the UE and receives scheduling requests from the UE. There are two types of scheduling grants: an Absolute Grant (AG) and a Relative Grant (RG). AGs can be sent only by the serving cell and transmitted over the E-DCH Absolute Grant Channel (E-AGCH), which is a shared resource among all users of the cell. The AG defines how many bits can be transmitted every transmission time interval (TTI), and thus a maximum limit of the data rate. The AG is valid until a new scheduling grant is received. The RG can modify this data rate up/down in the serving cell but only down in the non-serving cell. The UE uses a flag called a "Happy Bit" to indicate whether it would benefit from a higher rate grant or not.

The MAC-e/es protocol layers in the UE are responsible for HARQ and the transport format selection according to the scheduling grants. The created MAC-e PDU is transmitted over the air interface to the Node B. The MAC-e protocol layer in the Node B demultiplexes the MAC-e PDUs to MAC-es PDUs which are transmitted over the transport network to the SRNC. The MAC-es protocol layer in the RNC handles the effect of the SHO by reordering, duplicate removing, and macro combining to ensure in-sequence-delivery for the Radio Link Control (RLC) protocol layer.

While a connected UE may have several (MAC-es) flows multiplexed in one MAC-e flow, only one AG is assigned to the UE. This makes the congestion control challenging when some flows belonging to the same UE experience transport network congestion while others do not. In this case, the whole MAC-e flow can be treated as congested.

RLC Acknowledged Mode (AM), which is a Selective Repeat Automatic Repeat Request protocol, is used between the UE and SRNC to correct residual HARQ failures and to provide seamless channel switching. RLC AM does not include congestion control functionality because it assumes that RLC PDUs are transmitted by the MAC-d layer according to the available capacity. The RLC status messages, which are sent regularly, trigger retransmission of all missing PDUs.

This may result in unnecessary retransmissions because new status messages are sent before the retransmitted PDUs arrive, especially when there is long round trip time. Several unsuccessful retransmissions trigger an RLC reset, and the whole RLC window is discarded. The end-user IP packets never get lost in the transport network, unless the congestion causes RLC reset, and thus, TCP cannot detect transport network congestion based on duplicate acknowledgements. TCP "slow start" rapidly increases the TCP window size to its maximum, and it is normally kept at a maximum during the whole transmission unless a bottleneck other than the transport network is experienced. Too many retransmissions of the same PDU usually causes a TCP timeout that degrades the TCP efficiency. Consequently, TCP cannot control transport network congestion efficiently and a system-specific congestion control solution is needed.

Frame loss and the resulting RLC retransmission needs to be minimized because it significantly increases the delay variation among end-users. The transport network delay also needs to be kept low due to delay sensitive applications over HSUPA and to minimize control loop delay for flow control and RLC.

Flow control related Iub/Iur data and control frames are standardized in 3GPP TS 25.427 V6.8.0 and define the HSUPA flow control framework but not a particular flow control algorithm. The Iub/Iur E-DCH UL data frame (DF) contains the user data, the Frame Sequence Number (FSN), the Connection Frame Number (CFN), and Subframe Number. The CFN and Sub-frame Number are used for PDU reordering, but can also be used to calculate a Delay Reference Time (DRT) which defines when the data frame was sent from Node B. The FSN and DRT can be used to detect congestion in the transport network. Apart from congestion detection based on data frame fields, transport protocol specific congestion detection techniques may also be used. The TNL Congestion Indication Control Frame (TCI CF) may be used for reporting the congestion detected in SRNC. The TCI contains a congestion status field, which can indicate no congestion and congestion due to delay build-up or due to frame loss.

While the purpose of HSDPA flow control and HSUPA flow control is similar, there are differences between them. First, for HSUPA only the transport network bottleneck must be regulated, while for HSDPA there are also Uu scheduler queues in the Node B to be regulated (called MAC-hs Priority Queues). This also means that HSDPA flow control must deal with radio/air interface and transport network bottlenecks, but in case of HSUPA flow control the radio/air interface bottleneck is handled by the Uu scheduler. Second, and as mentioned above, HSUPA can be in SHO, while HSDPA not. This means that for the same UE there can be several (one serving and zero or more non-serving) flows to be controlled.

Figure 3:
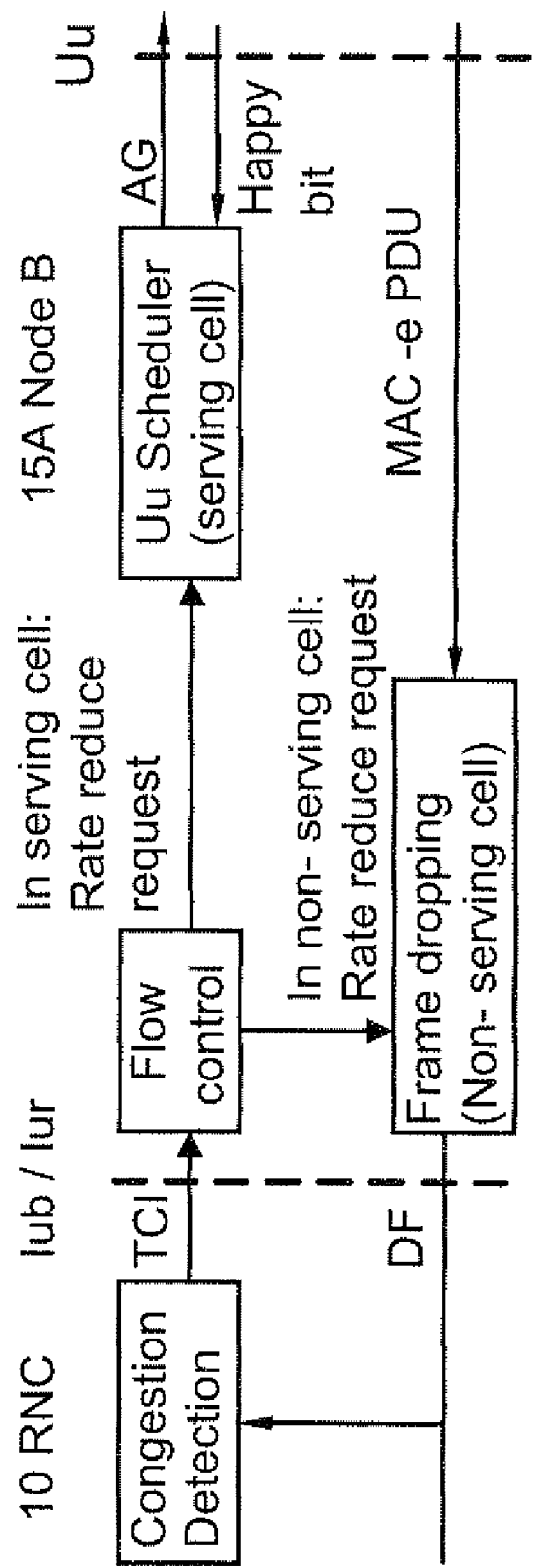
FIG. 3 is a block diagram illustrating a non-limiting example of an EUL flow control architecture and protocol stack.

FIG. 3 illustrates a non-limiting example flow control architecture. The flow control is designed to provide fair throughput sharing among the flows sharing the same transport network bottleneck when the transport network is limiting the throughput. The behavior of flows is regulated by the Uu scheduler in Node-B(s) until a transport network congestion is detected. As long as the transport network is not a bottleneck, the Uu scheduler tries to use the air interface as much as possible and to provide fairness among the flows. The Uu scheduler preferably increases the granted bit rate with a reasonable speed to avoid large interference peaks and to avoid sudden overload of the transport network.

When transport network congestion is detected, the flow control block takes over control to regulate the flows. One non-limiting example flow control algorithm may conform to an additive increase multiplicative decrease (AIMD) property. AIMD guarantees convergence to fairness; all flows converge to an equal share of resources in steady state, where no flows join or leave. A multiplication with a coefficient provides the multiplicative decrease and a constant increase rate after reduction provides the additive increase property. The AIMD property is met only for the serving cell. However, a MAC-e PDU is normally received in the serving cell with a higher probability, thus the end-user fairness is dominated by the serving cell.

The transport network congestion detection and notification may be performed whenever a data frame arrives at the SRNC. Two non-limiting example congestion detection methods may be used. One is FSN gap detection where a 4-bit FSN in the data frame can be used to detect lost data frames. The other is Dynamic Delay Detection (DDD) where the Node B DRT is compared to a similar reference counter in the SRNC when the data frame is received. The difference between the two counters increases when the transport network bottleneck buffer builds up. Congestion is detected when this difference increases too much compared to a minimum difference. The detected congestion and its severity are reported to the Node B by a TCI CF if no TCI CF was sent for a given time.

When congestion is detected, flow control is orchestrated in Node B. Whenever a TCI is received by the Node B, it triggers a congestion action by the flow controller. Depending on whether it is a serving cell flow or a non-serving cell flow, a rate reduce request is issued to the Un scheduler or to the Frame dropping functionality shown in FIG. 3.

Typically, a TCI received in the non-serving cell does not trigger rate reduction by a relative grant because a MAC-e PDU is assumed will be received in the best cell (usually the serving cell) with a higher probability. Consequently, if the bit rate is reduced due to transport network congestion limitations in the non-serving cell, the bit rate of the end-user might be reduced unnecessarily. However, congestion action still needs to be taken, and thus, part of the received MAC-e PDUs are dropped or discarded. If these PDUs are not received in the serving-cell, then the RLC AM retransmits them.

Figure 4:
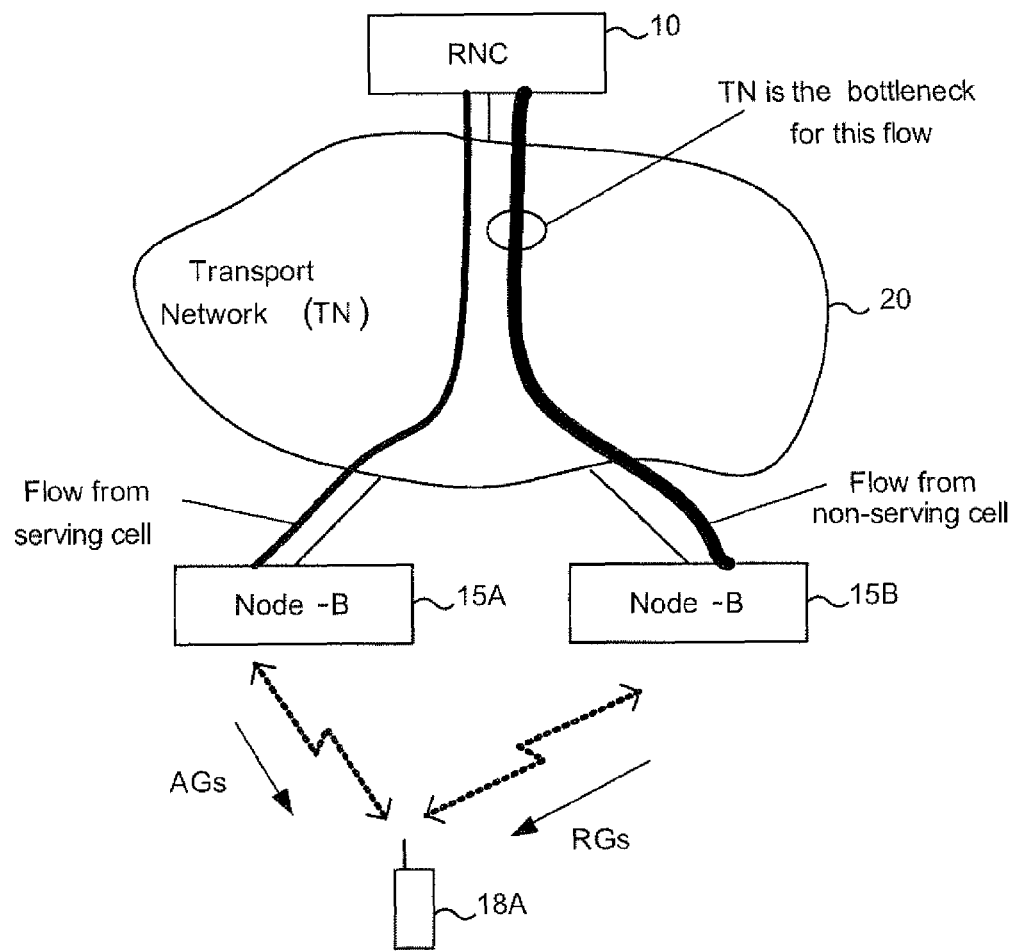
FIG. 4 is a diagram illustrating a transport network congestion situation for uplink flows from serving and non-serving cells.

FIG. 4 is a diagram illustrating a transport network congestion situation for uplink flows from serving and non-serving cells. The UE communicates with two cells from two different Node-Bs 15A and 15B because it is using uplink soft handover. The serving cell corresponds to Node-B 15A, and the non-serving cell corresponds to Node-B 15B. But in this example situation, the non-serving cell has a better radio quality than the serving cell in the uplink. For example, the uplink flow bit rate to the RNC 10 from non-serving cell is higher than the uplink flow bit rate from the serving cell to the RNC 10. The thickness of the line illustrates the bit rate of the data flow between each Node-B and the RNC. A thicker line means a higher bit rate. The flow from the serving cell and the flow from the non-serving cell can have different transport network bottlenecks. As will now be described, the system performance can be significantly improved when the flow from non-serving cell has a transport network bottleneck when it also has a higher uplink bit rate than the flow from the serving cell.

Figure 5:
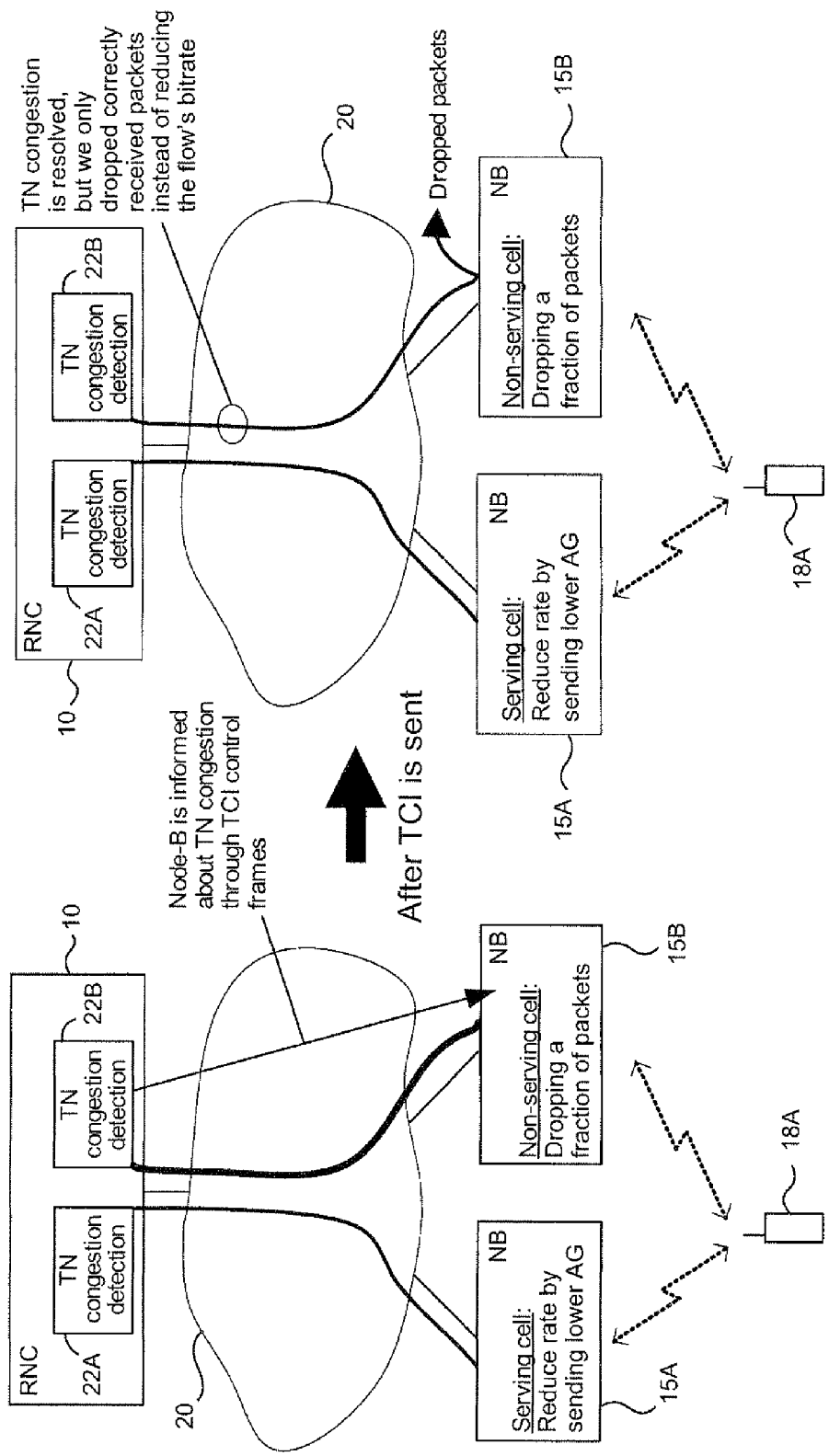
FIG. 5 illustrates an example of EUL flow control for the congestion situation in FIG. 4.

FIG. 5 illustrates an example of a typical EUL flow control for the congestion situation in FIG. 4. Each flow has transport network congestion detection functionality 22A, 22B in the RNC 10 to detect transport network congestion. For the non-serving cell flow (the thicker line), transport network congestion is detected at 22B, and the EUL flow control functionality in the Node-B 15B for the non-serving cell is informed about this transport network congestion using a control message, and example of which is a TCI control frame. The typical Node-B EUL flow control reacts differently to the TCI control frame depending whether it is for a serving cell flow or a non-serving cell flow. In the case of a non-serving cell flow, the typical EUL flow control starts to drop some fraction of incoming packets to reduce the bit rate of that flow towards the RNC. See the illustration on the right side of FIG. 5. By dropping packets, the EUL flow control resolves the transport network congestion. But the drawback with this approach is that correctly-received packets are dropped which can result in extensive retransmissions and poor end-user quality when the non-serving cell is the best cell in terms of radio communications quality in the uplink direction for this UE connection.

Figure 6:
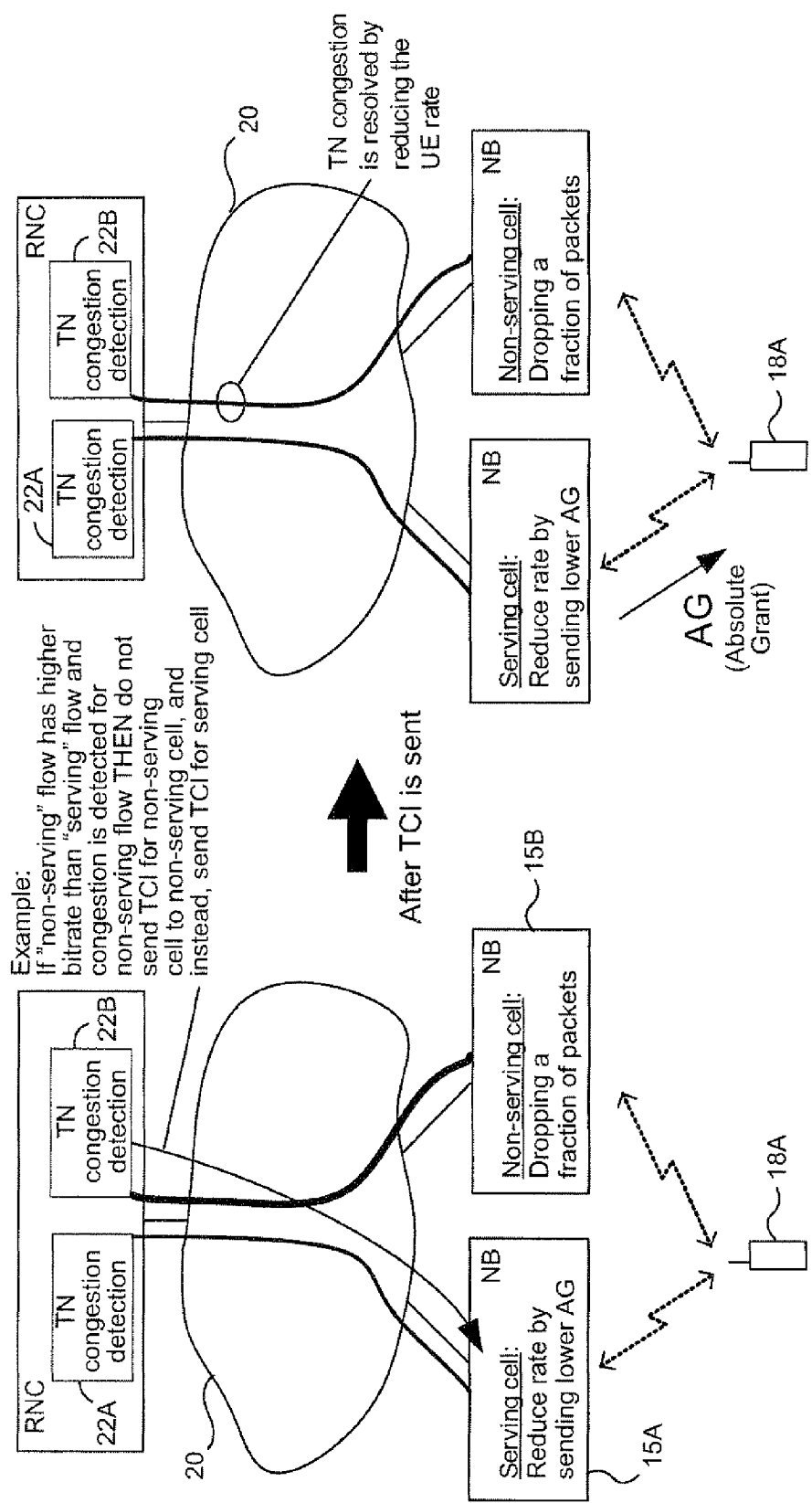
FIG. 6 illustrates an example of how to improve performance when controlling the congestion situation in FIG. 4.

FIG. 6 illustrates an example of how to improve performance when controlling the congestion situation in FIG. 4. The non-serving cell flow has a higher bit rate that the serving cell flow (again indicated by the thicker line), and congestion is detected in block 22B for the non-serving flow. But instead of sending the TCI to the non-serving cell Node-B 15B as was done in FIG. 5, the TCI is sent to the serving cell Node-B 15A as shown at the right side of FIG. 6. Instead of packet dropping for the uplink flow from the non-serving cell, the bit rate of this flow is reduced. As shown in the right side of FIG. 6, one way to reduce the uplink flow's bit rate is for the uplink flow controller in the serving cell Node-B 15A to respond to the TCI by sending a lower Absolute Grant (AG) to the UE 18A.

The TN congestion detection functionality 22A, 22B in the RNC may identify the situation when the TCI should be sent to serving cell instead of non-serving cell using measurement information. For example, the bit rate of each flow coming from the same UE is measured, e.g., by counting the number of incoming packets (amount of arrived bytes) and calculating a corresponding bit rate regularly. The measured bit rate is the amount of data arrived within a preset time period divided by that time period. When transport network congestion is detected, then based on the measured flow's bit rate, the destination of the TCIs is checked. If the transport network is detected for a non-serving flow and its measured uplink bit rate is the higher that the serving flow's, then the TN congestion detector 22B sends a TCI to the serving cell. Otherwise, the TCI is sent to the corresponding cell (the cell which is connected to the RNC by the congested TN link). Preferably, a robust method is used in bit rate comparison based on current and previous measured bit rates.

Figure 7:
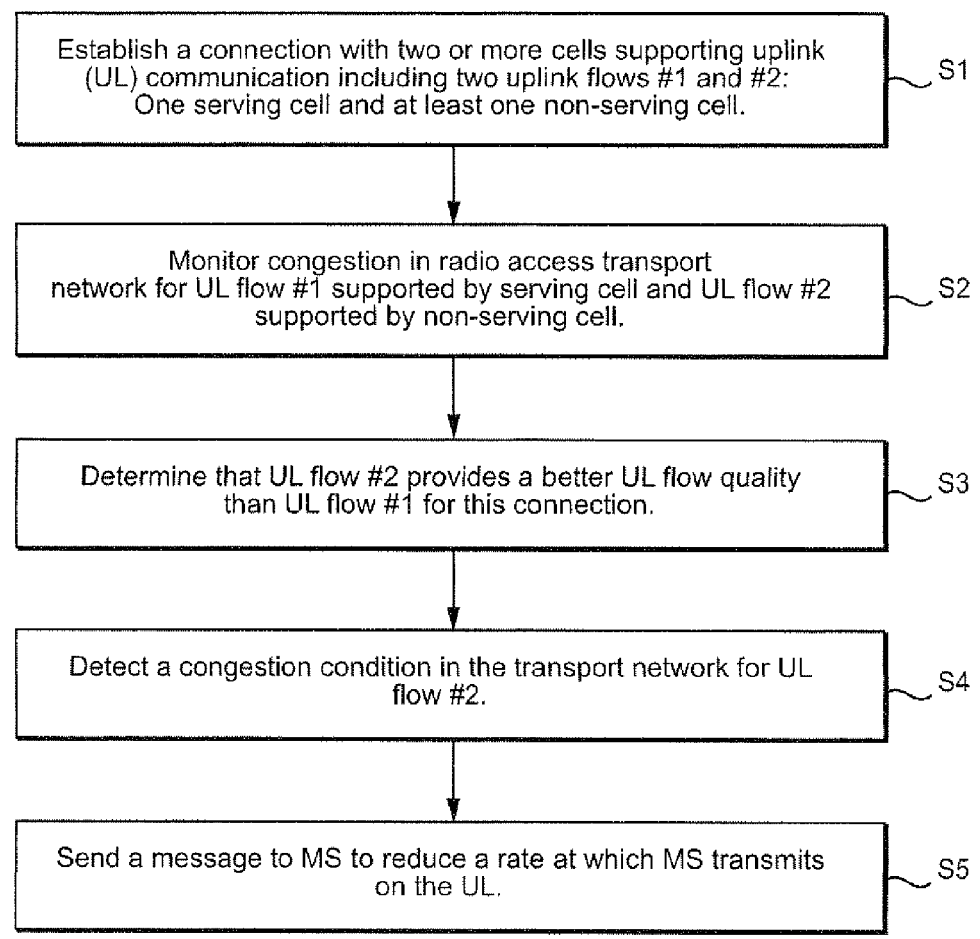
FIG. 7 is a flowchart illustrating non-limiting example procedures for carrying out the approach illustrated in FIG. 6.

FIG. 7 is a flowchart illustrating non-limiting example procedures for carrying out the approach illustrated in FIG. 6. Initially, a connection is established with two or more cells supporting uplink communication including two uplink flows #1 and #2: one serving cell and at least one non-serving cell (step S1). The congestion is monitored in the radio access transport network for uplink flow #1 supported by the serving cell and uplink flow #2 supported by the non-serving cell (step S2). The uplink flow #2 is determined to be currently providing a better uplink flow quality than the uplink flow #1 for this connection (step S3). A congestion condition is detected in the transport network for the uplink flow #2 (step S4). A message is then sent to the UE to reduce a rate at which the UE transmits data on the uplink (step S5).

Figure 8:
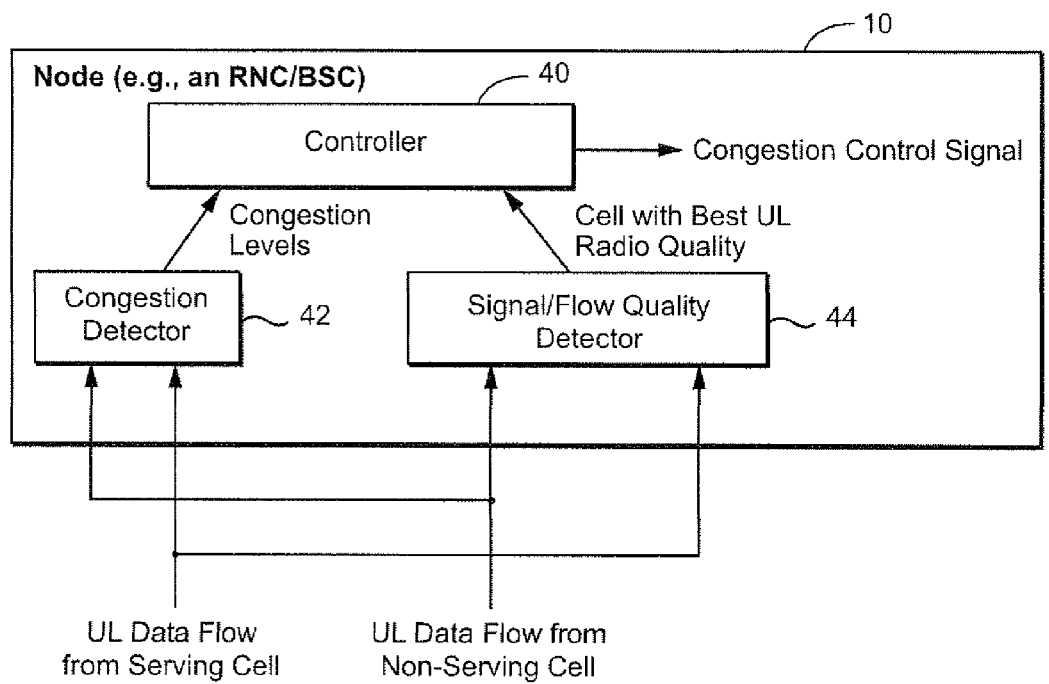
FIG. 8 is a non-limiting example function block diagram of a node that may be used to implement the procedures of FIG. 7.

FIG. 8 is a non-limiting example function block diagram of a node that may be used to implement the procedures of FIG. 7. The RNC 10 includes a congestion controller 40, a congestion detector 42, and a signal/flow quality detector 44. The signal/flow quality detector 44 monitors the quality of the uplink flows from the serving and non-serving cells by monitoring for example each flow's signal strength, signal-to-noise ratio, error rate, etc., and provides the quality values to the controller 40. The congestion detector 42 monitors the congestion levels for each flow using for example the technique described above and provides the detected congestion levels for each flow to the controller 40. Based on the congestion levels and the best cell quality information, the controller 40 may send out a congestion control signal, e.g., a TCI.

The technology described above takes into account the fact that the non-serving cell can be the best cell for uplink communications with the UE with reasonably high probability even though the serving cell is chosen based on downlink radio quality. In this case, performance is improved by better handling of congestion (rate reduction instead of frame dropping), fairness is improved because all the flows are behaving following AIMD. As a result, at least the best cell is always AIMD. The technology is also relatively easy to implement and does not require a change to existing standards.

Although various embodiments have been shown and described in detail, the claims are not limited to any particular embodiment or example. None of the above description should be read as implying that any particular element, step, range, or function is essential such that it must be included in the scope of the claims. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method for controlling congestion in a radio access transport network that includes a radio network controller coupled to multiple base stations with each base station supporting one or more cells, where mobile radio terminals communicate with the radio access transport network over an air interface, the method comprising:

establishing a connection between a mobile radio terminal with at least two cells associated with the radio access transport network being used to support uplink radio communication from the mobile radio terminal, one of the cells corresponding to a serving cell for the uplink radio communication and another of the cells being a non-serving cell for the uplink radio communication;

monitoring congestion in the radio access transport network for a first radio uplink flow associated with the connection and supported by the serving cell;

monitoring congestion in the radio access transport network for a second radio uplink flow associated with the connection and supported by the non-serving cell;

determining whether the second radio uplink flow is associated with a better radio link quality than radio link quality associated with the first radio uplink flow;

detecting a congestion condition in the radio access transport network for the second radio uplink flow; and in response to the detected congestion condition in the radio access transport network for the second radio uplink flow when the second radio uplink flow is associated with a better radio link quality than radio link quality associated with the first radio uplink flow, sending a message to the mobile radio terminal to reduce a rate at which the mobile radio terminal transmits data for the connection to the radio access transport network.

2. The method in claim 1, wherein if the first uplink flow is determined to be associated with a better radio link quality than the second uplink flow and a congestion condition in the radio access transport network for the second uplink flow is detected, then a fraction of uplink flow data packets from mobile radio terminal are discarded in order to reduce the detected congestion for the second uplink flow.

3. The method in claim 1, wherein in response to the detected uplink congestion condition in the radio access transport network for the second uplink flow, the message is sent to the mobile radio terminal via the serving cell to reduce a rate at which the mobile radio terminal transmits data for the connection to the radio access transport network.

4. The method in claim 1, wherein the better radio link quality is determined based on a data rate associated with the first uplink flow and a data rate associated with the second uplink flow such that the uplink flow with the higher data rate has the better flow quality.

5. The method in claim 1, wherein the serving cell provides better downlink radio signal quality for the connection than the non-serving cell and the non-serving cell provides better uplink radio signal quality for the connection than the serving cell.

6. The method in claim 1, wherein the message to the mobile radio terminal to reduce a rate at which the mobile radio terminal transmits data for the connection is a lower absolute grant message.

7. The method in claim 1, wherein the radio access transport network supports soft handover in the uplink and the first and second uplink flows are part of soft handover of the connection in the uplink.

8. The method in claim 1, wherein the radio access transport network supports enhanced uplink transmission, wherein the congestion control message is a transport network congestion indicator, and wherein in response to the detected uplink congestion condition in the radio access transport network for the second uplink flow, the transport network congestion indicator is sent to the serving cell for transmission to the mobile radio terminal.

9. The method in claim 1, wherein the method is implemented in the radio network controller.

10. A node for controlling congestion in a radio access transport network that includes a radio network controller coupled to multiple base stations with each base station supporting one or more cells, where mobile radio terminals communicate with the radio access transport network over an air interface, and where there is a connection between a mobile radio terminal with at least two cells associated with the radio access transport network being used to support uplink radio communication from the mobile radio terminal, one of the cells corresponding to a serving cell for the uplink radio communication and another of the cells being a non-serving cell for the uplink radio communication, the node comprising:

congestion monitoring circuitry configured to monitor a congestion condition in the radio access transport network for a first radio uplink flow associated with the connection and supported by the serving cell and a congestion condition in the radio access transport network for a second radio uplink flow associated with the connection and supported by the non-serving cell;

signal quality processing circuitry configured to determine whether the second radio uplink flow provides a better radio uplink flow quality than the first radio uplink flow; and control circuitry coupled to the signal quality processing circuitry and to the congestion monitoring circuitry and configured to generate a message to be sent to the mobile radio terminal to reduce a rate at which the mobile radio terminal transmits data for the connection to the radio access transport network in response to the congestion monitoring circuitry detecting a congestion condition in the radio access transport network for the second radio uplink flow and the signal quality processing circuitry determining that the second radio uplink flow provides a better radio uplink flow quality than the first radio uplink flow.

11. The node in claim 10, wherein if the signal quality processing circuitry determines that the first uplink flow provides a better uplink flow quality than the second uplink flow and a congestion condition in the radio access transport network for the second uplink flow is detected, then the control circuitry is configured to have a message sent to a base station associated with the non-serving cell to discard a fraction of second flow data packets transmitted from the mobile radio terminal in order to reduce the detected congestion for the second uplink flow.

12. The node in claim 10, wherein in response to the detected uplink congestion condition in the radio access transport network for the second uplink flow, the control circuitry is configured to send a message to the mobile radio terminal via the serving cell to reduce a rate at which the mobile radio terminal transmits data for the connection to the radio access transport network.

13. The node in claim 10, wherein radio uplink flow quality is determined based on a data rate associated with the first and second uplink flows such that the uplink flow with the higher data rate has the better flow quality.

14. The node in claim 10, wherein the serving cell provides better radio downlink flow quality for the connection than the non-serving cell and the non-serving cell provides better radio uplink flow quality for the connection than the serving cell.

15. The node in claim 10, wherein the radio access transport network supports soft handover in the uplink and the first and second uplink flows are part of soft handover of the connection in the uplink.

16. The node in claim 10, wherein the radio access transport network supports enhanced uplink transmission, wherein the congestion control message is a transport network congestion indicator, and wherein in response to the detected uplink congestion condition in the radio access transport network for the second uplink flow, control circuitry is configured to generate the transport network congestion indicator to be sent to the serving cell.

17. The node in claim 10, wherein the node is a radio network controller.

* * * * *